(12) United States Patent
Fukuda

(10) Patent No.: US 12,467,524 B2
(45) Date of Patent: Nov. 11, 2025

(54) DEVICE FOR ESTIMATING DEGREE OF FATIGUE OF MOTIVE FORCE TRANSMITTING COMPONENT, AND METHOD FOR ESTIMATING DEGREE OF FATIGUE OF MOTIVE FORCE TRANSMITTING COMPONENT

(71) Applicant: ISUZU MOTORS LIMITED, Tokyo (JP)

(72) Inventor: Yoshihisa Fukuda, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 965 days.

(21) Appl. No.: 16/982,773

(22) PCT Filed: Mar. 20, 2019

(86) PCT No.: PCT/JP2019/011752
§ 371 (c)(1),
(2) Date: Sep. 21, 2020

(87) PCT Pub. No.: WO2019/182023
PCT Pub. Date: Sep. 26, 2019

(65) Prior Publication Data
US 2021/0010581 A1    Jan. 14, 2021

(30) Foreign Application Priority Data
Mar. 20, 2018    (JP) .................................. 2018-052277

(51) Int. Cl.
*B60L 3/12*    (2006.01)
*B60L 50/50*    (2019.01)
(Continued)

(52) U.S. Cl.
CPC ............. *F16H 57/01* (2013.01); *F16H 59/14* (2013.01); *F16H 2057/012* (2013.01)

(58) Field of Classification Search
CPC .... F16H 57/01; F16H 59/14; F16H 2057/012; F16H 61/12; Y02T 10/70; B60L 3/0084;
(Continued)

(56) References Cited

U.S. PATENT DOCUMENTS

2004/0016123 A1    1/2004    Sandner
2006/0058932 A1    3/2006    Garg et al.
(Continued)

FOREIGN PATENT DOCUMENTS

CN    205719535        11/2016
CN    206223579 U  *   6/2017
(Continued)

OTHER PUBLICATIONS

Bai et al., Analysis of Powertrain Loading Dynamic Characteristics and the Effects on Fatigue Damage, Sep. 5, 2017, MDPI, Applied Sciences, doi: 10.3390/app7101027 (Year: 2017).*
(Continued)

*Primary Examiner* — Jelani A Smith
*Assistant Examiner* — George A Alcorn, III

(57) ABSTRACT

This device for estimating a degree of fatigue of a motive force transmitting component is a device for estimating the degree of fatigue of a motive force transmitting component in a motive force transmitting system from a motor/generator (drive source) to a driving wheel (wheel), and is provided with an estimation unit which estimates the degree of fatigue of the motive force transmitting component on the basis of the magnitude and direction of torque acting on the motive force transmitting component, and an output unit which outputs a signal indicating that the degree of fatigue has exceeded a threshold if the degree of fatigue exceeds a prescribed threshold that is set in advance, wherein the degree of fatigue is estimated by the different methods when the motive force transmitting component is a gear or a shaft.

5 Claims, 7 Drawing Sheets

(51) Int. Cl.
  *F16H 57/01* (2012.01)
  *F16H 59/14* (2006.01)
  *F16H 61/12* (2010.01)
  *G01M 13/02* (2019.01)

(58) Field of Classification Search
  CPC ........ B60L 2260/44; B60L 3/12; B60L 50/50; G01M 13/02; B60Y 2300/184; B60Y 2300/1845
  USPC ....................................................... 701/29.1
  See application file for complete search history.

(56) References Cited

U.S. PATENT DOCUMENTS

| | | | |
|---|---|---|---|
| 2009/0096463 A1 | 4/2009 | Kanamori et al. | |
| 2010/0310373 A1* | 12/2010 | Castell Martinez | F03D 15/00 416/61 |
| 2015/0134189 A1 | 5/2015 | Wash | |
| 2015/0283996 A1* | 10/2015 | Wang | B60K 6/48 180/65.265 |
| 2017/0212012 A1* | 7/2017 | Unuma | G01M 17/007 |
| 2017/0257054 A1* | 9/2017 | Tsumasaka | B60K 6/46 |
| 2019/0389507 A1* | 12/2019 | Murakami | B62D 5/0481 |

FOREIGN PATENT DOCUMENTS

| | | | | |
|---|---|---|---|---|
| CN | 106959211 | | 7/2017 | |
| JP | 07239287 A | | 9/1995 | |
| JP | H07239287 A | * | 9/1995 | |
| JP | 2004243924 A | | 9/2004 | |
| JP | 2006087293 A | | 3/2006 | |
| JP | 2006177287 A | | 7/2006 | |
| JP | 2008116317 A | | 5/2008 | |
| JP | 2008128149 A | | 6/2008 | |
| JP | 2012025521 A | * | 2/2012 | |
| JP | 2013079920 A | * | 5/2013 | ........... G07C 5/0808 |
| JP | 2013231673 A | * | 11/2013 | .......... G01M 13/021 |
| WO | WO 2013/162039 | | 10/2013 | |

OTHER PUBLICATIONS

International Search Report for Internationa Application No. PCT/JP2019/011752, Mailing Date, Jun. 25, 2019.

* cited by examiner

DEVICE FOR ESTIMATING DEGREE OF FATIGUE OF MOTIVE FORCE TRANSMITTING COMPONENT, AND METHOD FOR ESTIMATING DEGREE OF FATIGUE OF MOTIVE FORCE TRANSMITTING COMPONENT

CROSS REFERENCE TO RELATED APPLICATIONS

This is the U.S. national stage of application No. PCT/JP2019/011752, filed on Mar. 20, 2019. Priority under 35 U.S.C. § 119(a) and 35 U.S.C. § 365(b) is claimed from Japanese Application No. 2018-052277, filed Mar. 20, 2018, the disclosure of which is also incorporated herein by reference.

TECHNICAL FIELD

The present disclosure relates to an apparatus and a method for estimating the fatigue degree of a power transmission component.

BACKGROUND ART

Patent Literature (hereinafter, referred to as "PTL") 1 describes a technique for quantitatively determining the state of an engine or a transmission. In PTL 1, the load state applied to the engine or the transmission is detected by a torque sensor, a vehicle speed sensor, and/or the like, and the state of the engine or the transmission is quantitatively determined based on the cumulative time when the value of the detected load is greater than a predetermined threshold and/or the like.

CITATION LIST

Patent Literature

PTL 1
Japanese Patent Application Laid-Open No. 2004-243924

SUMMARY OF INVENTION

Technical Problem

It is desired to estimate the fatigue degree for each component constituting the power transmission system. PTL 1 discloses that the judgment result of the state of the engine and the transmission is used as a judgment material for performing inspection and maintenance of the vehicle, however, does not specifically disclose how to use the judgment result.

In recent years, an electric vehicle (EV) powered by a motor driven by electricity, and a hybrid electric vehicle (HEV) using an internal combustion engine and the motor together have become popular. In some cases, electric power regeneration is performed by using the motor in EV or HEV, the load applied to the driving transmission system is different from that in normal traveling when the electric power regeneration is performed, so it is necessary to estimate the fatigue degree for each part in consideration of this.

It is an object of the present disclosure to provide a fatigue degree estimation device and a fatigue degree estimation method of the power transmission component capable of estimating the fatigue degree for each component of the power transmission system.

Solution to Problem

An fatigue degree estimation device for a power transmission component according to an aspect of the present disclosure is the fatigue degree estimation device for the power transmission component in a power transmission system from a driving source to a wheel, the device including: an estimation section for estimating a fatigue degree of the power transmission component based on a magnitude and a direction of torque acting on the power transmission component; and an output section for outputting a signal indicating that the fatigue degree exceeds a predetermined threshold, when the fatigue degree exceeds the threshold.

A fatigue degree estimation method for a power transmission component according to an aspect of the present disclosure is the fatigue degree estimating method for the power transmission component in a power transmission system from a driving source to a wheel, the method including: estimating a fatigue degree of the power transmission component based on a magnitude and a direction of the torque acting on the power transmission component; and outputting a signal indicating that the fatigue degree exceeds a predetermined threshold, when the fatigue degree exceeds the threshold.

Advantageous Effects of Invention

According to the present disclosure, the fatigue degree can be estimated for each component of the power transmission system.

DESCRIPTION OF EMBODIMENTS

Hereinafter, Embodiments of the present disclosure will be described in detail with reference to the drawings. There are cases where a more detailed description than necessary, for example, a detailed description of already well-known matters, a duplicated description of substantially the same configuration, and/or the like are omitted.

Embodiment 1

Figure 1:
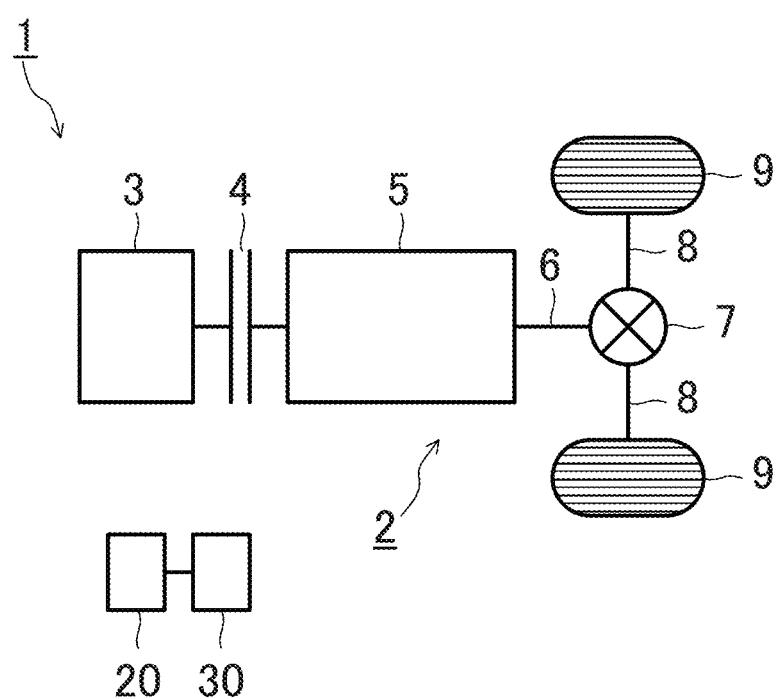
FIG. 1 is a diagram illustrating a configuration of vehicle according to Embodiment 1.

FIG. 1 is a diagram illustrating a configuration of vehicle 1 according to Embodiment 1. As illustrated in FIG. 1, in Embodiment 1, vehicle 1 is an EV powered by a motor/generator as a driving source.

[Configuration of Vehicle 1]

Vehicle 1 includes motor/generator 3, clutch 4, transmission 5, propeller shaft 6, final reduction gear 7, driving shafts 8, 8, and driving wheels 9, 9. In Embodiment 1, power transmission system 2 includes transmission 5, propeller shaft 6, final reduction gear 7, and driving shafts 8.

[Configuration of Fatigue Degree Estimation Device 20]

Figure 2:
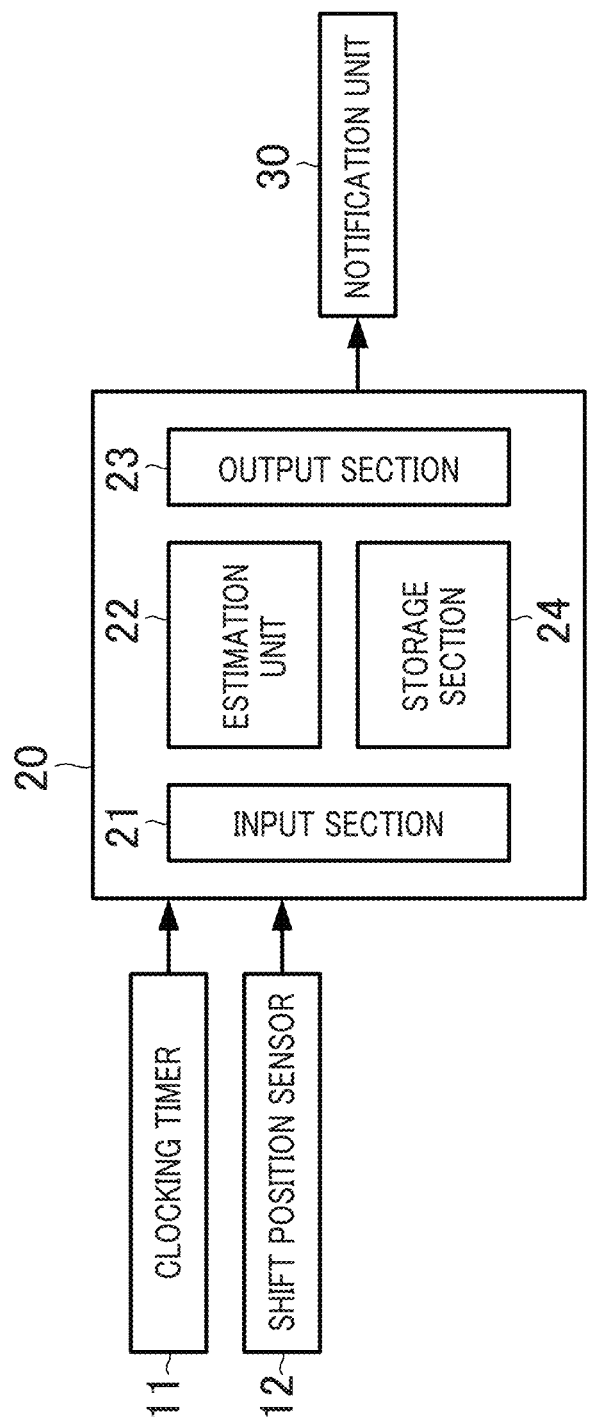
FIG. 2 is a diagram illustrating a configuration of fatigue degree estimation device.

Next, with reference to FIG. 2, the configuration of fatigue degree estimation device 20 for estimating the fatigue degree for each component of power transmission system 2 will be described. FIG. 2 is a diagram illustrating a configuration of fatigue degree estimation device 20. Fatigue degree estimation device 20 includes input section 21, estimation section 22, output section 23, and storage section 24. In Embodiment 1, fatigue degree estimation device 20 is mounted on vehicle 1.

Input section 21 receives information with respect to the operating state of motor/generator 3 during traveling of vehicle 1, time information from clocking timer 11, and the input of the shift position information from shift position sensor 12. The operating state of motor/generator 3 includes a power traveling state in which motor/generator 3 rotates driving wheels 9 and a regenerative state in which motor/generator 3 is rotated by the rotation of driving wheels 9 to absorb torque. The information with respect to the operating state includes information including the rotational speed, the voltage, the current, the frequency, and/or the like of motor/generator 3 in the power traveling state or the regenerative state of vehicle 1.

Estimation section 22 evaluates the fatigue degree of each component of power transmission system 2, based on the information with respect to the operating state inputted to input section 21, the time information, and the shift position information.

Output section 23 outputs a notification signal to notification section 30 in the case where the fatigue degree becomes higher than a predetermined threshold, based on the evaluation result in estimation section 22.

Storage section 24 stores various data used in estimating the fatigue degree of each component of power transmission system 2 in estimation section 22. As an example, storage section 24 stores data with respect to the characteristics of motor/generator 3, and data with respect to fatigue fracture obtained in advance for each component of power transmission system 2.

Notification section 30 is, for example, an instrument panel and/or the like of vehicle 1, and display on the instrument panel and/or the like that the fatigue degree of the components of power transmission system 2 has become higher than the predetermined threshold. It is desirable that Notification section 30 notifies which component the fatigue degree is increased, within the components constituting power transmission system 2. The notification form of notification section 30 is not particularly limited in the present disclosure. Notification section 30 may be an alarm and/or the like.

[Processing of Fatigue Degree Estimation Device 20]

Next, it will be described in detail about fatigue degree estimation process for each component of power transmission system 2 performed by estimation section 22 of fatigue degree estimation device 20.

Figure 3:
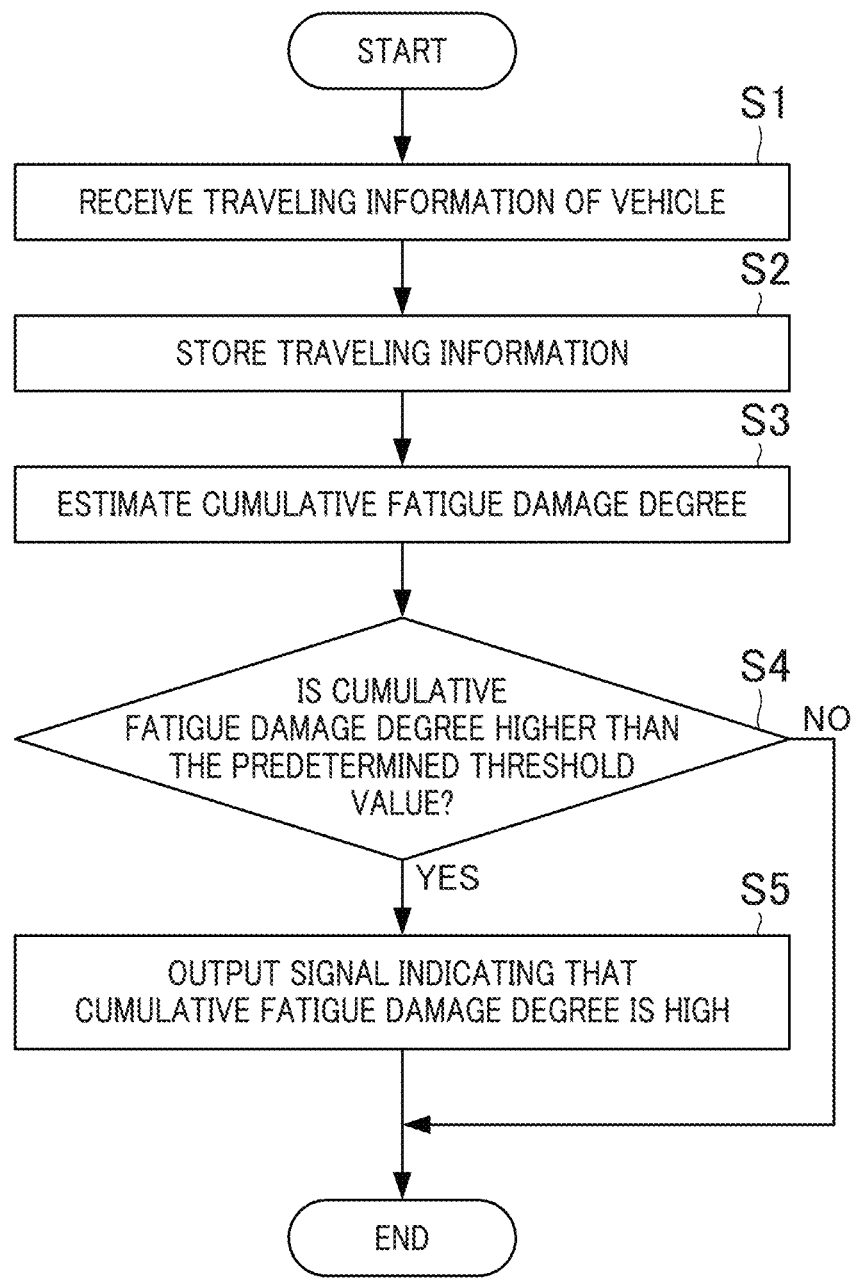
FIG. 3 is a flowchart for explaining the fatigue degree estimation process performed in estimation section for each component of power transmission system.

FIG. 3 is a flowchart for explaining the fatigue degree estimation process performed in estimation section 22 for each component of power transmission system 2. The process illustrated in FIG. 3 is repeatedly performed at a predetermined cycle during traveling of vehicle 1.

First, in step S1, estimation section 22 receives traveling information of vehicle 1 such as information with respect to the operating state inputted to input section 21, the time information, the shift position information and/or the like.

In step S2, estimation section 22 stores the traveling information received from input section 21 in storage section 24.

In step S3, estimation section 22 estimates the fatigue degree (cumulative fatigue damage degree) for each component of power transmission system 2, based on the information stored in storage section 24, The fatigue degree (cumulative fatigue damage degree) is a value of digitalizing the fatigue accumulated up to the present time in the case where the value when a component is broken by fatigue is set as 1. Therefore, the cumulative fatigue damage degree takes a value from 0 to 1. A method of calculating the cumulative fatigue damage degree for each component will be described later.

In step S4, estimation section 22 determines whether the cumulative fatigue damage degree is higher than the predetermined threshold, for each component of power transmission system 2. Since the component is damaged when the cumulative fatigue damage degree becomes 1, the predetermined threshold is set to, for example, a value close to 0.9 or 1. For example, in the case where the user of vehicle 1 desires to receive the notification immediately before the component is destroyed, the threshold may be set to a value near 1, and in the case where the user desires to receive the notification before that, the threshold may be set to 0.9 or the like.

In the case where it is determined in step S4 that the cumulative fatigue damage degree of the component of power transmission system 2 is higher than the threshold (step S4:YES), the process proceeds to step S5. Then, in step S5, estimation section 22 ends the process, after causing output section 23 to notify that the cumulative fatigue damage degree of the corresponding part is high by notification section 30.

On the other hand, in step S4, in the case where the cumulative fatigue damage degree of power transmission system 2 is not determined to be higher (step S4:NO), estimation section 22 ends the process without causing output section 23 to perform the notification by notification section 30.

[Relationship between Direction of Torque Acting on Component and Part where Fatigue Accumulates]

In Embodiment 1, estimation section 22 calculates the cumulative fatigue damage degree of the component of power transmission system 2 based on the torque acting on the component. In this disclosure, the cumulative fatigue damage degree is evaluated in more detail, by calculating the cumulative fatigue damage degree for each direction of the torque acting on the component and accumulating each independently. The following describes the relationship between the direction of torque acting on the component and the part where fatigue accumulates.

In Embodiment 1, transmission 5, propeller shaft 6, final reduction gear 7, and driving shafts 8 are assumed as components of power transmission system 2. In other words, the components of power transmission system 2 are either gears or shafts.

When vehicle 1 travels by the output torque of motor/generator 3, each component of power transmission system 2 performs rotational motion respectively by the output torque, and transmits the output torque to driving wheels 9.

Further, when performing electric power regeneration by inputting the rotational torque of driving wheels 9 to motor/generator 3, each component of power transmission system 2 performs rotational motion respectively by this rotational torque, and transmits the rotational torque to motor/generator 3.

The direction of torque acting on the component differs depending on the case where motor/generator 3 accelerates vehicle 1 in the forward direction and the case where it accelerates in the reverse direction. The case where motor/generator 3 accelerates vehicle 1 in the backward direction includes the case where vehicle 1 during traveling in the forward direction is decelerated by the electric power regeneration of motor/generator 3, and the case where vehicle 1 travels backward by the reverse rotation of motor/generator 3.

Figure 4:
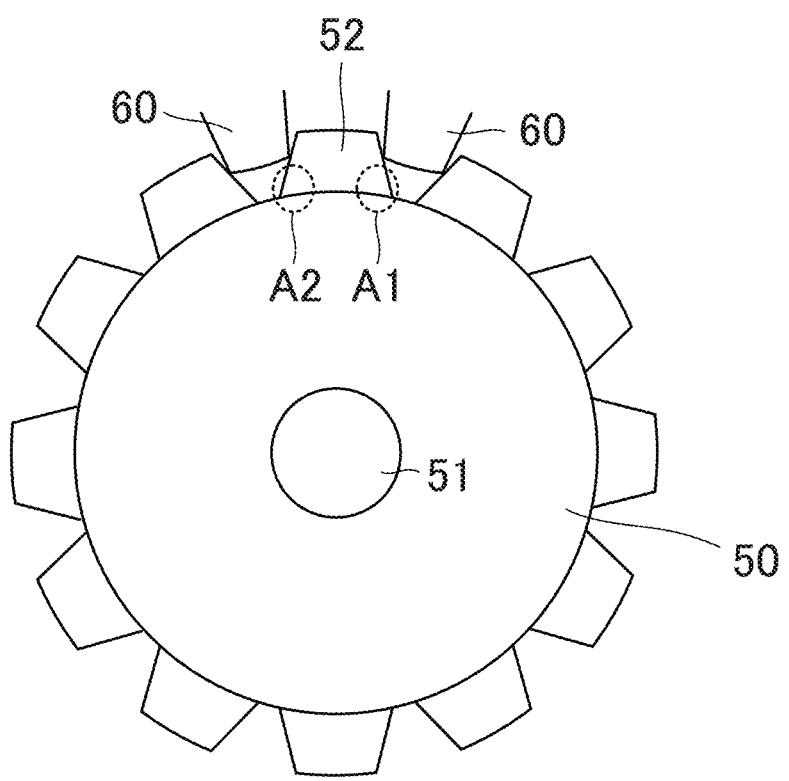
FIG. 4 is a diagram illustrating transmission gear of transmission as an example of a component of power transmission system.

FIG. 4 is a diagram illustrating transmission gear 50 of transmission 5 as an example of a component of power transmission system 2. Transmission gear 50 transmits the torque inputted through shaft 51 to the other transmission gear 60 in contact with teeth 52. Transmission gear 50 is assumed to rotate clockwise when vehicle 1 is in the state of traveling forward, and to rotate counterclockwise in the state of traveling backward. Although transmission gear 50 of FIG. 4 is illustrated in a simple shape for explanation, it is desirable that an involute gear is actually used.

In the case where motor/generator 3 accelerates vehicle 1, the torque in the clockwise direction through shaft 51 is transmitted to transmission gear 50. On the other hand, in the case where motor/generator 3 decelerates vehicle 1, the torque in the counterclockwise direction through shaft 51 is transmitted to transmission gear 50.

In FIG. 4, when the torque in the clockwise direction is transmitted to transmission gear 50, the stress concentrates on the tooth surface on the right side of tooth 52 in contact with transmission gear 60. When the load of such stress is repeatedly applied, fatigue accumulates, for example, in a part on the right side of the root of tooth 52, that is, the portion A1 in FIG. 4. Conversely, when the torque in the counterclockwise direction is transmitted to transmission gear 50 in FIG. 4, the stress is concentrated on the tooth surface on the left side of tooth 52 in contact with transmission gear 60. When such stress is repeatedly applied, fatigue accumulates, for example, in a part near the root left side of tooth 52, that is, a portion A2 in FIG. 4.

Thus, depending on the direction of the torque (applied stress) acting on the component, the fatigue may be accumulated on the different parts in the same component. Therefore, in this disclosure, the cumulative fatigue damage degree is calculated for each direction of the torque acting on the component. In the above description, transmission gear 50 of transmission 5 having symmetrical teeth 52 has been described as an example. However, for example, the hypoid gear used in final reduction gear 7 has asymmetric teeth in the left and right direction. Even if the load of the same stress is given on the left and right surfaces of the teeth respectively for the same time period, the fatigue degree is different between the part near the right side of the root and the part near the left side of the root of the tooth. More specifically, in the hypoid gear, since the tooth shape is formed obliquely on the side of the tooth on which stress is applied in the case where vehicle 1 is accelerated in the forward direction, this side is stronger against stress than the side of the tooth on which stress is applied in the case where vehicle 1 is accelerated in the backward direction, and the fatigue is less likely to accumulate in the part near the root of the tooth. In other words, in the hypoid gear, the fatigue is easily accumulated on the side of the teeth where the stress is applied in the case where vehicle 1 is accelerated in the backward direction, and easily broken as compared with the opposite side. As described above, by estimating the fatigue degree for each direction of the torque acting on the component, even for component such as the hypoid gear, which have different susceptibility to damage on the left and right sides of the tooth surface of the gear, it is possible to estimate the fatigue degree for each right and left sides of the tooth surface.

In the above description, the case where the form of the component is the gear has described, however, the concept is the same even in the case where the form of the component is a shaft. In the case where the form of the component is the shaft, the part where the stress is concentrated depending on the direction of the torque acting may not change. In such a case, rather than calculating the cumulative fatigue damage degree for each direction of the torque acting as described above, it is sufficient to add the cumulative fatigue damage degree for each direction.

[Method of Calculating Cumulative Fatigue Damage Degree]

Hereinafter, a specific method of calculating the cumulative fatigue damage degree will be described.

The magnitude $T_a$ of the torque acting on each component of power transmission system 2 is calculated by the following equation (1) using the magnitude $T_{MG}$ of the torque outputted by motor/generator 3 or of the torque inputted to motor/generator 3, and the gear ratio $r_T$ of the current transmission stage in transmission 5, and the gear ratio $r_O$ till the component downstream than transmission 5.

$$T_a = T_{MG} \times r_T \times r_O \quad \text{(Equation 1)}$$

In equation (1), the torque $T_a$ is calculated by multiplying the torque $T_{MG}$ by the gear ratio $r_T$ of the current transmission stage of transmission 5 and the gear ratio $r_O$ for each component. Alternatively, the gear ratio from motor/generator 3 to each component of power transmission system 2 in all the transmission stages of transmission 5 may be obtained in advance by tests and stored in storage section 24, and the torque $T_a$ may be calculated using this.

The magnitude $T_{MG}$ of the torque outputted by motor/generator 3, or the torque inputted to motor/generator 3 is obtained based on the information of the operating state of vehicle 1 inputted from motor/generator 3, for example, as follows. That is, the torque outputted by motor/generator 3 is obtained based on the motor characteristics of motor/generator 3, the input current/voltage to motor/generator 3, the frequency of motor/generator 3, the rotational speed, and/or the like. The torque inputted to motor/generator 3 is obtained based on the motor characteristics of motor/generator 3, and the amount of electric power regeneration by motor/generator 3. The current/voltage inputted to motor/generator 3, the rotational speed, the relationship between the frequency or the like and the output torque, or data with respect to the motor characteristics indicating the relationship between the amount of the electric power regeneration and the input torque is previously measured by experiments and stored in storage section 24.

In such a way, estimation section 22 can identify the direction and the magnitude of the torque acting on each component of power transmission system 2.

Storage section 24 stores in advance a T-N diagram for each component of power transmission system 2. In Embodiment 1, the T-N diagram is a diagram illustrating the relationship between the magnitude T of the torque repeatedly acting on the component and the number of times N of breakage, and indicates that the component is damaged when how much magnitude of the torque is applied how many times. The T-N diagram is an example of the data with respect to the fatigue fracture described above as being stored in storage section 24.

Estimation section 22 calculates the cumulative fatigue damage degree for each component, and for each direction of the torque acting, based on the direction and the magnitude of the torque acting on the component, and the number of times that the torque acts, and the T-N diagram, as specified above. Estimation section 22 obtains the direction and the magnitude of the torque acting on the component, and the number of times that the torque acts on the component from motor/generator 3.

Figure 5:
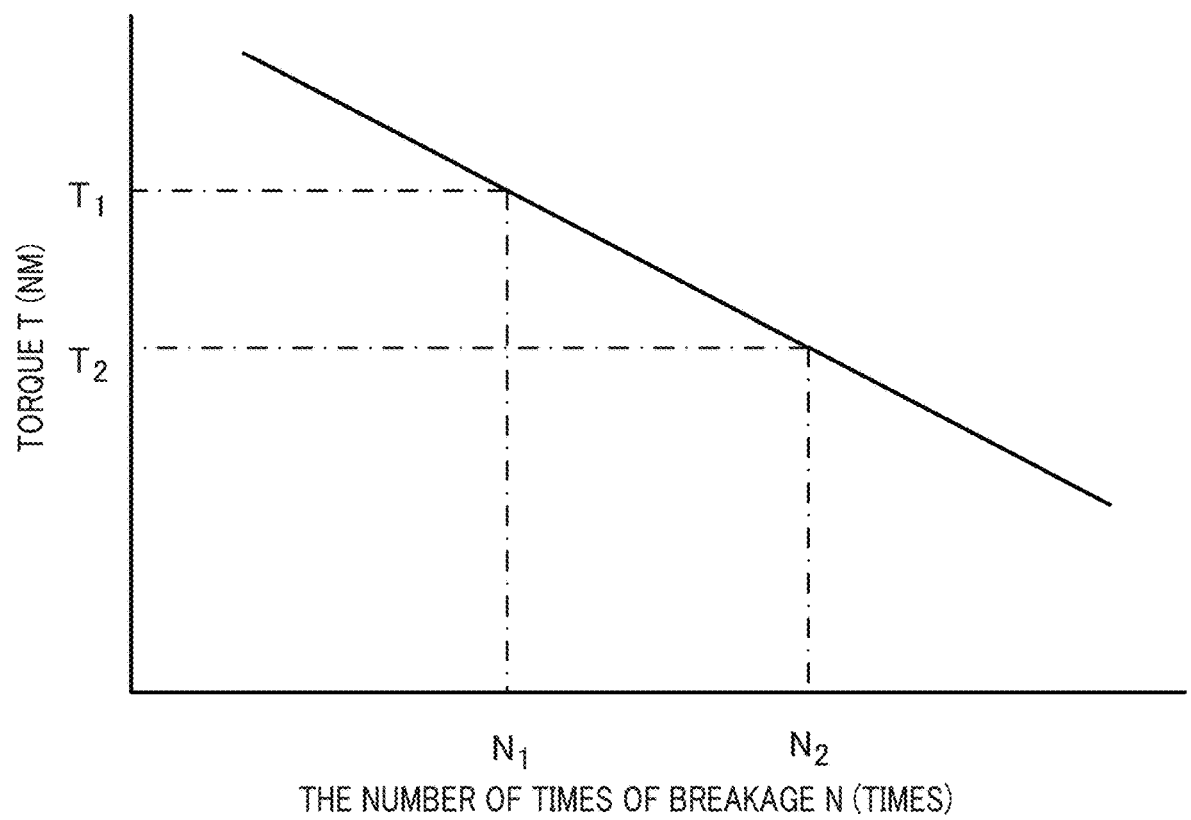
FIG. 5 is a diagram illustrating the T-N diagram of a certain component of power transmission system.

Specific examples will be described. FIG. 5 is a diagram illustrating the T-N diagram of a certain component of power transmission system 2. The case where the torque $T_1$ acts $n_1$ times and the torque $T_2$ acts $n_2$ times on the certain component. As illustrated in FIG. 5, the number of damage in the torque $T_1$ is $N_1$, the number of damage in the torque $T_2$ is $N_2$.

At this time, the fatigue damage degree $\Delta D_1$ by the torque $T_1$ is calculated by the following equation (2).

[2]
$$\Delta D_1 = \frac{n_1}{N_1} \quad \text{(Equation 2)}$$

Similarly, the fatigue damage degree $\Delta D_2$ by the torque $T_2$ is calculated by the following equation (3).

[3]
$$\Delta D_2 = \frac{n_2}{N_2} \quad \text{(Equation 3)}$$

The cumulative fatigue damage degree D in the case where the torque $T_1$ acts $n_1$ times and torque $T_2$ acts $n_2$ times on the certain component is calculated by the following equation (4).

$$D = \Delta D_1 + \Delta D_2 \quad \text{(Equation 4)}$$

Actually, the cumulative fatigue damage degree D is calculated by accumulating the fatigue damage due to all the torques acting within a predetermined period of time for each component and each direction of the torque.

When the cumulative fatigue damage degree D calculated in this manner reaches 1, it is considered that the corresponding part of the component (the part corresponding to the direction on which the torque acts) is damaged by the fatigue. As described above in the present disclosure, in order to calculate the cumulative fatigue damage degree for each direction on which torque acts, the T-N diagram for each direction on which torque acts relative to the certain part is stored in advance in storage section 24.

As described above, estimation section 22 calculates the cumulative fatigue damage degree, for each component, and for each direction on which torque acts on the component. Therefore, for example, in the case where the component is the gear as illustrated in FIG. 4, it is possible to calculate the cumulative fatigue damage degree at each of the parts on both sides of the tooth.

Figure 6:
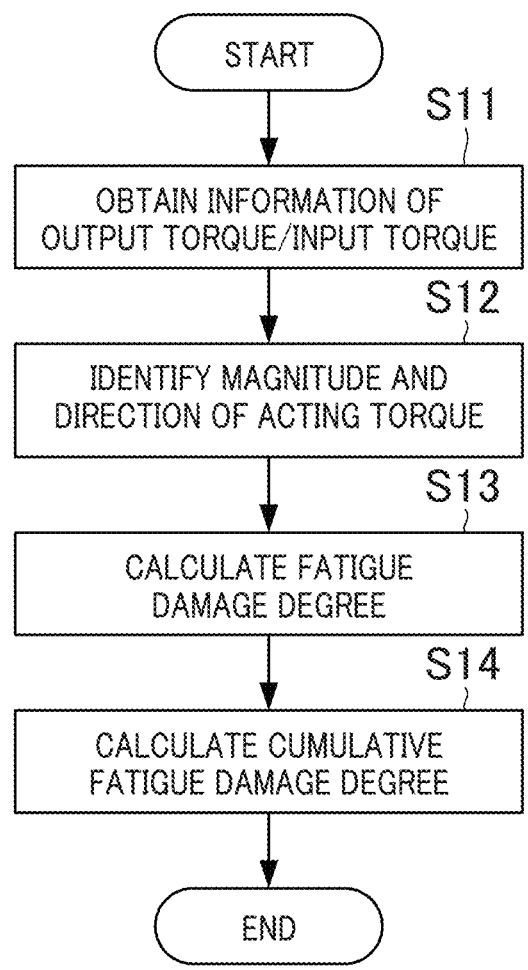
FIG. 6 is a flowchart for explaining the calculation process of the cumulative fatigue damage degree performed in estimation section.

FIG. 6 is a flowchart for explaining the calculation process of the cumulative fatigue damage degree performed in estimation section 22. The processing illustrated in FIG. 6 is performed independently for each component of power transmission system 2. In the following description, the component to be processed is described as the component P.

In step S11, estimation section 22 calculates the torque outputted from motor/generator 3 or the torque inputted to motor/generator 3, based on the information, which is inputted from motor/generator 3, about the operating state of vehicle 1 in the predetermined period of time, and the motor characteristics stored in storage section 24.

In step S12, estimation section 22 identifies the direction and the magnitude of the torque acting on the component P, in a predetermined period, by using the torque calculated in step S11. The magnitude of the torque acting on the component P is calculated using the above equation (1).

In step S13, estimation section 22 calculates the fatigue damage degree in the predetermined period, for each direction and the magnitude of the torque acting on the component P. The fatigue degree damage degree is calculated by using the above equation (2) or (3).

In step S14, estimation section 22 calculates the cumulative fatigue damage degree, for each direction of the torque acting on the component P. The cumulative fatigue damage degree is calculated by using the above equation (4).

[Effects]

As described above, fatigue degree estimation device 20 according to Embodiment 1 of the present disclosure is fatigue degree estimation device 20 of the power transmission component in power transmission system 2 from motor/generator 3 (driving source) to driving wheels 9 (wheels), including estimation section 22 for estimating the fatigue degree of the power transmission component based on the magnitude and the direction of torque acting on the power transmission component, and output section 23 for outputting a signal indicating that the fatigue degree exceeds a predetermined threshold, when the fatigue degree exceeds the threshold.

In such a way, even in the case where the different parts are fatigued in the same component, depending on the direction of the torque acting on the component, it is possible to calculate the cumulative fatigue damage degree for each fatigued component. Thus, it becomes possible to more suitably perform the estimation of the fatigue degree for each component of power transmission system 2. It is possible to estimate the fatigue degree about the component of which fatigue degree due to the torque (regenerative torque of motor/generator 3, and/or the like) in the case of accelerating vehicle 1 in the backward direction is easily accumulated, such as a hypoid gear.

Embodiment 2

In Embodiment 1 described above, vehicle 1 is the EV. In Embodiment 2 described below, vehicle 1A is a hybrid electric vehicle (HEV) using motor/generator 3 and internal combustion engine 10 as a driving source.

Figure 7:
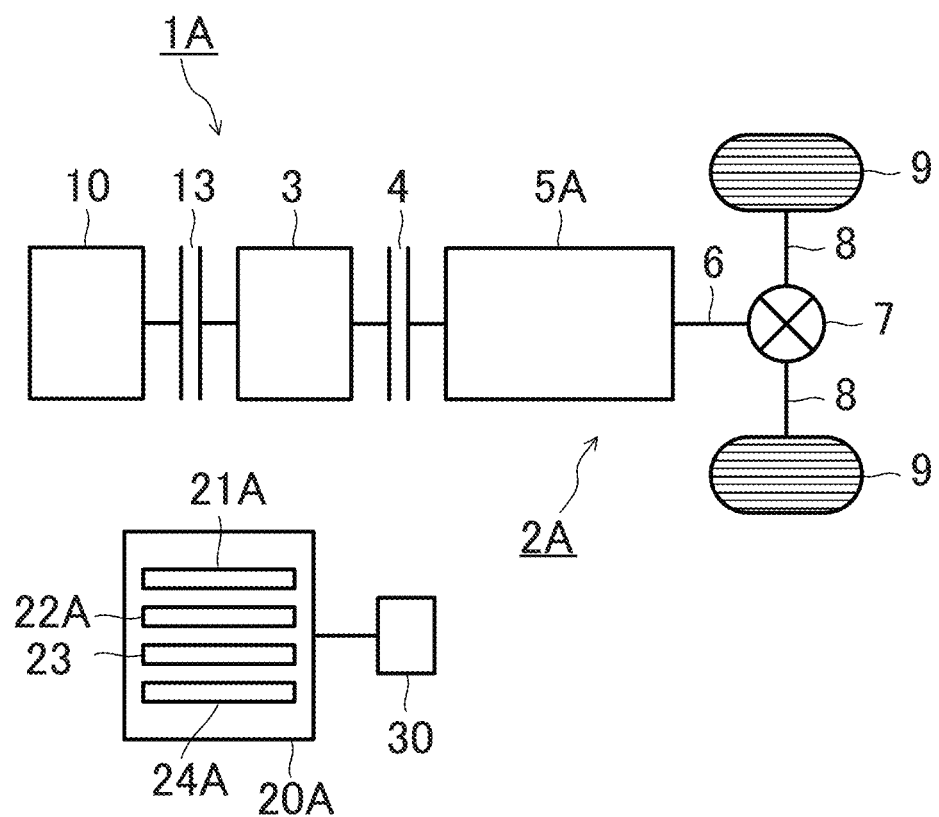
FIG. 7 is a diagram illustrating a configuration of vehicle according to Embodiment 2.

FIG. 7 is a diagram illustrating a configuration of vehicle 1A according to Embodiment 2. In Embodiment 2, a configuration having the same name and the different operation as those of Embodiment 1 will be described by adding "A" to the reference numerals. The configuration of vehicle 1A is the same as that of vehicle 1 of Embodiment 1 except for internal combustion engine 10, clutch 13, and estimation section 22A. Internal combustion engine 10 burns fuel to generate the output torque. Clutch 13 connects or disconnects internal combustion engine 1 and motor/generator 3.

Also in Embodiment 2, the fatigue degree for each component of power transmission system 2A, fatigue degree estimation device 20A mounted on vehicle 1A is estimated. Hereinafter, the fatigue degree estimation process performed by estimation section 22A of fatigue degree estimation device 20A will be described only for different points from Embodiment 1.

In the hybrid vehicle, the torque acting on each component of power transmission system 2A includes not only the torque caused by motor/generator 3 but also the torque caused by internal combustion engine 10. Therefore, estimation section 22A calculates the cumulative fatigue damage degree for each component of power transmission system 2A and for each direction of the torque acting in consideration of the torque caused by internal combustion engine 10.

Specifically, estimation section 22A adds the output torque of internal combustion engine 10 to the output torque of motor/generator 3 to calculate the magnitude of the torque acting on each component of power transmission system 2A. The output torque of internal combustion engine 10 is obtained based on the fuel injection amount to internal combustion engine 10 and the data with respect to the characteristics of internal combustion engine 10. Data with respect to the fuel injection amount to internal combustion engine 10 is obtained by, for example, input section 21A, from an ECU (Engine Control Unit) (not illustrated) and/or the like. Data with respect to the characteristics of internal combustion engine 10 is measured in advance by tests and stored in storage section 24A.

When the braking torque, for example, such as an exhaust brake, is generated by internal combustion engine 10, estimation section 22A identifies the direction of the torque acting on each component by the braking torque and the magnitude of the braking torque. The magnitude of the braking torque, for example, stored in advance in storage section 24A, is calculated based on data relating to the characteristics of the braking brake.

In Embodiment 2 in which vehicle 1A is the hybrid electric vehicle, unlike Embodiment 1 in which vehicle 1 is the EV, backward travel of vehicle 1A is realized by using the backward gears of transmission 5A. Therefore, when the vehicle 1A moves backward, the direction of torques acting on the components may be reversed from the direction of Embodiment 1 depending on the position of the components of power transmission system 2A (whether the component is downstream of the backward gears or not). Thus, in the case where the backward gear is selected in transmission 5A, estimation section 22A identifies the direction of the torque acting on each component in consideration of this.

[Effect]

As described above, according to Embodiment 2, in vehicle 1A is the hybrid electric vehicle, it is possible to calculate the cumulative fatigue damage degree for each component of power transmission system 2A, and for each direction of the torque acting. Thus, even in vehicle 1A which is the hybrid electric vehicle, it is possible to more suitably perform the estimation of the fatigue degree for each component of power transmission system 2A.

Various embodiments have been described above with reference to the drawings, however, the present disclosure is not limited to such examples. It is understood that the skilled in the art will obviously be able to reach at various change examples or modification examples within the scope set forth in the claims, and that they also belong to the technical scope of the present disclosure of course. The configuration elements in the above Embodiments may be arbitrarily combined without departing from the spirit of the disclosure.

In Embodiment described above, fatigue degree estimation device 20 (20A) is mounted on vehicle 1 (1A), however, the present disclosure is not limited thereto. Fatigue degree estimation device 20 (20A) may not be mounted on vehicle 1 (1A), may be installed outside vehicle 1 (1A). The installation position of fatigue degree estimation device 20 (20A) includes, for example, a house or a garage of a user or an administrator of vehicle 1 (1A), a store of a maintenance person (e.g., a dealer) of vehicle 1 (1A), a maintenance factory, and/or the like. Fatigue degree estimation device 20 may be provided in a server device and/or the like other than the above. In the case where fatigue degree estimation device 20 (20A) is installed outside vehicle 1 (1A), fatigue degree estimation device 20 (20A) may obtain the data for calculating the cumulative fatigue damage degree from vehicle 1 (1A) by using a wireless communication and/or the like.

In Embodiment described above, notification section 30 is mounted on vehicle 1 (vehicle 1A), however, the present disclosure is not limited thereto. Notification section 30 may not be mounted on vehicle 1 (1A). Specifically, notification section 30 may be a notification device which is installed outside vehicle 1 (1A), and which is capable of performing the notification of components having high fatigue degree and short durable life to the user, the administrator, or the maintenance person. In this case, notification section 30 may receive the notification signal from fatigue degree estimation device 20 (20A) by using the wireless communication and/or the like.

In the above described embodiment, estimation section 22 calculates the fatigue damage degree by using the T-N diagram indicating the relationship between the magnitude T of the torque acting repeatedly on the component and the number of breakage N, however, the present disclosure is not limited thereto. Estimation section 22 may be configured to calculate the fatigue damage by using an S-N diagram (a Wöhler curve) indicating the relationship between the stress S repeatedly acting on the component and the number of breakages N. In this case, estimation section 22 may calculate the fatigue damage by calculating the stress based on the magnitude of the torque acting on the component and the rotational radius of the component.

This application is entitled to and claims the benefit of Japanese Patent Application No. 2018-052277 filed on Mar. 20, 2018, the disclosure of which including the specification, drawings and abstract is incorporated herein by reference in its entirety.

INDUSTRIAL APPLICABILITY

The present disclosure can estimate the fatigue degree for each component of the power transmission system based on the direction and magnitude of the acting torque.

REFERENCE SIGNS LIST 1, 1A vehicle
2, 2A Power transmission system
3 Motor/generator
4 Clutch
5, 5A Transmission
6 Propeller shaft
7 Final reduction gear
8 Driving shaft
9 Driving wheel
10 Internal combustion engines
11 Clocking timer 12 Shift position sensor
13 Clutch
20,20A Fatigue degree estimation device
21, 21A Input section
22,22A Estimation section
23 Output section
24,24A Storage section
30 Notification section
50 Transmission gear
51 shaft
52 Tooth
60 Transmission gear

The invention claimed is:

1. A fatigue degree estimation device for a power transmission component in a power transmission system from a driving source comprising a motor/generator and an internal combustion engine to a wheel of a hybrid electric vehicle, the device comprising:
a memory storing a fatigue threshold database and a characteristics database of the motor/generator; and
a processor coupled to the memory, wherein the processor is configured to perform the processing to:
receive, from the motor/generator, information of an operating state of the vehicle at least once per a predetermined period of time, the information including the input current and voltage to the motor/generator, the frequency of the motor/generator, and the rotational speed of the motor/generator;
obtain, based on the information of the operating state of the vehicle and the characteristics database of the motor/generator, a magnitude and a direction of a first torque outputted by the motor/generator;
calculate, based on the first torque and a second torque outputted by the internal combustion engine, output torque outputted from the driving source by adding the first torque and the second torque;
estimate, based on the calculated output torque, a magnitude and a direction of an acting torque acting on the power transmission component;
estimate a cumulative fatigue damage degree for the power transmission component by different estimation methods depending on the type of power transmission component, based on the magnitude and the direction of the acting torque, and the number of times that the acting torque has acted on the power transmission component within the predetermined period of time, wherein estimating the cumulative fatigue damage degree comprises:
when the power transmission component is a gear, by accumulating the magnitude of the acting torque for each direction of the acting torque acting on the gear within the predetermined period, or
when the power transmission component is a shaft, by accumulating the magnitude of the acting torque regardless of the direction of the torque acted on the shaft within the predetermined period; and
compare the estimated cumulative fatigue damage degree with a corresponding threshold stored in the fatigue threshold database; and
output a signal indicating that the cumulative fatigue damage degree exceeds a predetermined threshold for the power transmission component, when the estimated cumulative fatigue damage degree exceeds the corresponding threshold for the power transmission component.

2. A fatigue degree estimation device according to claim 1, wherein calculating the output torque comprises calculating, based on a fuel injection amount to the internal combustion engine and the data with respect to characteristics of the internal combustion engine, the second torque.

3. A fatigue degree estimation device according to claim 1, wherein estimating the magnitude and the direction of the acting torque comprises estimating, based on braking torque by the internal combustion engine, the magnitude and the direction of the acting torque.

4. A fatigue degree estimation device according to claim 1, wherein estimating the magnitude and the direction of the acting torque comprises estimating, based on whether the power transmission component is downstream of a backward gear or not, the magnitude and the direction of the acting torque acting on the power transmission component, when the hybrid electric vehicle moves backward.

5. A fatigue degree estimating method performed by a processor for a power transmission component in a power transmission system from a driving source comprising a motor/generator and an internal combustion engine to a wheel of a hybrid electric vehicle, the processor performs processing to:
receive, from the motor/generator, information of an operating state of the vehicle at least once per a predetermined period of time, the information including the input current and voltage to the motor/generator, the frequency of the motor/generator, and the rotational speed of the motor/generator;
obtain, based on the information of the operating state of the vehicle and a characteristics database of the motor/generator, a magnitude and a direction of a first torque outputted by the motor/generator;
calculate, based on the first torque and a second torque outputted by the internal combustion engine, output torque outputted from the driving source by adding the first torque and the second torque;
estimate, based on the calculated output torque, a magnitude and a direction of an acting torque acting on the power transmission component;
estimate a cumulative fatigue damage degree of the power transmission component by different estimation method depending on the type of the power transmission component, based on the magnitude and the direction of the acting torque, and the number of times the acting torque has acted on the power transmission component in the predetermined period of time obtained from the driving source, wherein estimating the cumulative fatigue damage degree comprises:
when the power transmission component is a gear, by accumulating the magnitude of the acting torque for each direction of the torque acting on the gear in the predetermined period, or
when the power transmission component is a shaft, by accumulating the magnitude of the acting torque regardless of the direction of the torque within the predetermined period; and
compare the estimated cumulative fatigue damage degree with a corresponding threshold stored in a fatigue threshold database stored in the memory; and
output a signal indicating that the cumulative fatigue damage degree exceeds a predetermined threshold for the power transmission component, when the estimated fatigue degree exceeds the corresponding threshold for the power transmission component.

* * * * *